(12) United States Patent
Becherer

(10) Patent No.: US 10,060,549 B2
(45) Date of Patent: Aug. 28, 2018

(54) VALVE ACTUATOR FOR RAILWAY TANK CAR

(71) Applicant: TransQuip USA, Inc., Jacksonville, FL (US)

(72) Inventor: Joseph C. Becherer, Corinth, TX (US)

(73) Assignee: Transquip USA, Inc., Jacksonville, FL (US)

( * ) Notice: Subject to any disclaimer, the term of this patent is extended or adjusted under 35 U.S.C. 154(b) by 76 days.

(21) Appl. No.: 15/147,831

(22) Filed: May 5, 2016

(65) Prior Publication Data

US 2016/0327180 A1 Nov. 10, 2016

Related U.S. Application Data

(60) Provisional application No. 62/159,053, filed on May 8, 2015.

(51) Int. Cl.
| | |
|---|---|
| *F16K 35/02* | (2006.01) |
| *F16K 31/60* | (2006.01) |
| *F16K 35/10* | (2006.01) |
| *B61D 5/00* | (2006.01) |

(52) U.S. Cl.
CPC .......... *F16K 35/027* (2013.01); *F16K 31/602* (2013.01); *F16K 35/02* (2013.01); *F16K 35/10* (2013.01); *B61D 5/00* (2013.01)

(58) Field of Classification Search
CPC .......... F16K 35/02; F16K 35/027; B61D 5/00
USPC ........................................................ 251/96
See application file for complete search history.

(56) References Cited

U.S. PATENT DOCUMENTS

| | | | | |
|---|---|---|---|---|
| 2,250,356 | A | * | 7/1941 | Brumbaugh .......... F16K 35/027 126/42 |
| 3,012,584 | A | * | 12/1961 | Carlson ................. F16K 35/027 137/614.12 |
| 3,656,710 | A | | 4/1972 | Shaw |
| 3,764,103 | A | * | 10/1973 | Oliverio ................ F16K 35/027 137/384.2 |
| 3,930,634 | A | * | 1/1976 | Loveless ................. F16K 35/02 251/96 |
| 3,981,481 | A | | 9/1976 | Reedy et al. |
| 4,141,535 | A | | 2/1979 | Reedy et al. |

(Continued)

FOREIGN PATENT DOCUMENTS

EP 0560247 A1 9/1993

*Primary Examiner* — Kevin Murphy
(74) *Attorney, Agent, or Firm* — Knobbe, Martens, Olson & Bear, LLP

(57) ABSTRACT

A valve actuator can include an elongate shaft configured to engage with a valve stem of a valve assembly. The elongate shaft can include a weakened portion between the first and second ends. The actuator can include an elongate tube configured to receive a portion of the elongate shaft. A can engage a valve stem of a valve assembly a portion of the elongate shaft. The biasing member can bias the elongate shaft away from the valve stem. The elongate shaft can transition between partially and fully engaged positions. The elongate can inhibit accidental rotation of a valve stem when in the partially engaged position. The elongate shaft can be incapable of rotating a valve stem when in the partially engaged position. The elongate shaft can be capable of rotating a valve stem when in a fully engaged position. The biasing member can bias the elongate shaft toward the partially engaged position.

8 Claims, 15 Drawing Sheets

(56) References Cited

U.S. PATENT DOCUMENTS

| | | | | |
|---|---|---|---|---|
| 4,549,716 A | * | 10/1985 | Warren | F16K 31/60 |
| | | | | 192/69.91 |
| 5,490,660 A | * | 2/1996 | Kamezawa | F16K 35/027 |
| | | | | 251/96 |
| 5,544,675 A | | 8/1996 | Dean | |
| 5,931,444 A | | 8/1999 | Chronister | |
| 6,138,715 A | * | 10/2000 | LaLone | F16K 5/0642 |
| | | | | 137/797 |
| 6,651,697 B2 | | 11/2003 | Gonsior | |
| 7,178,781 B2 | * | 2/2007 | Trappa | F16K 35/027 |
| | | | | 251/96 |

\* cited by examiner

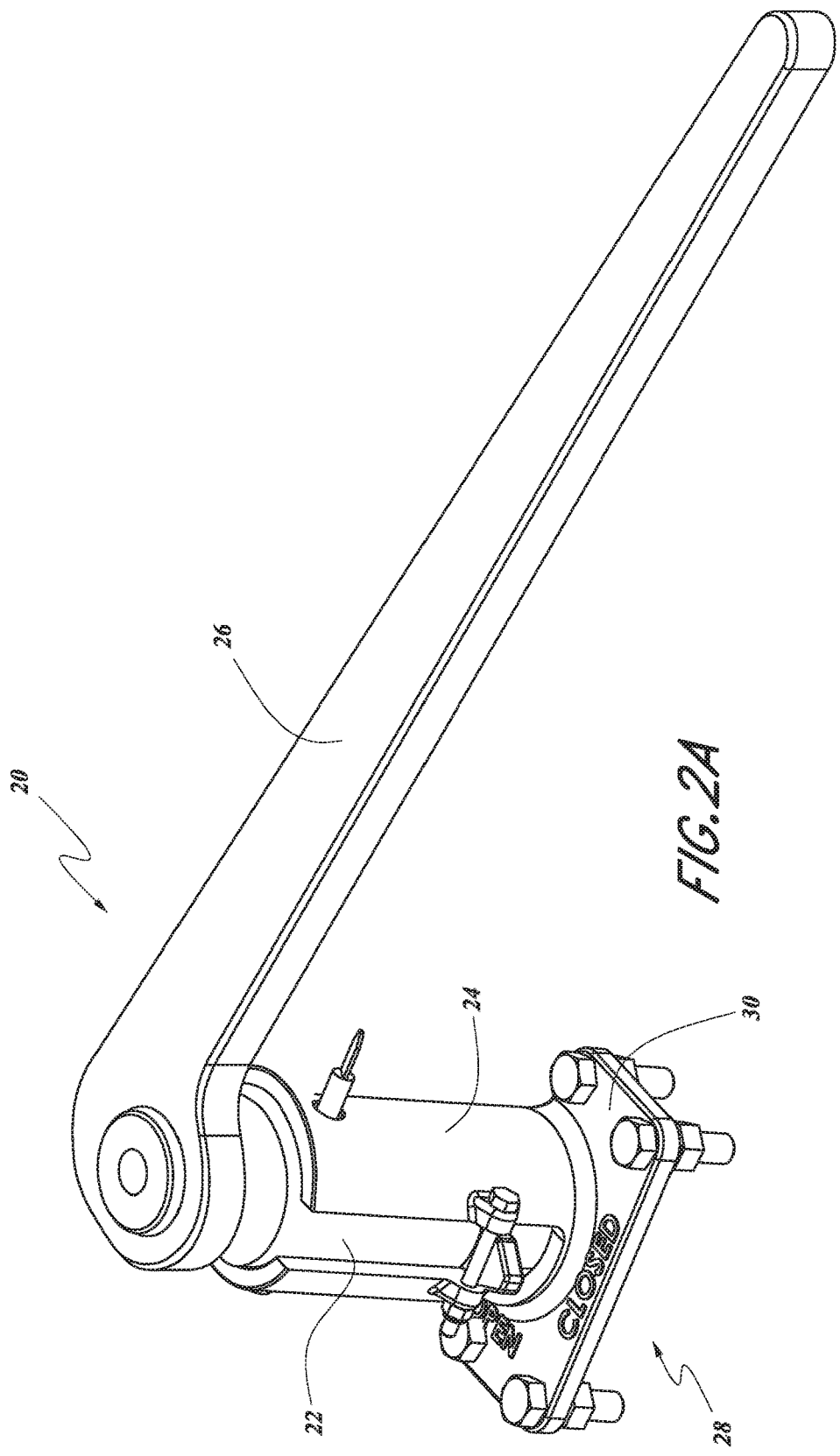

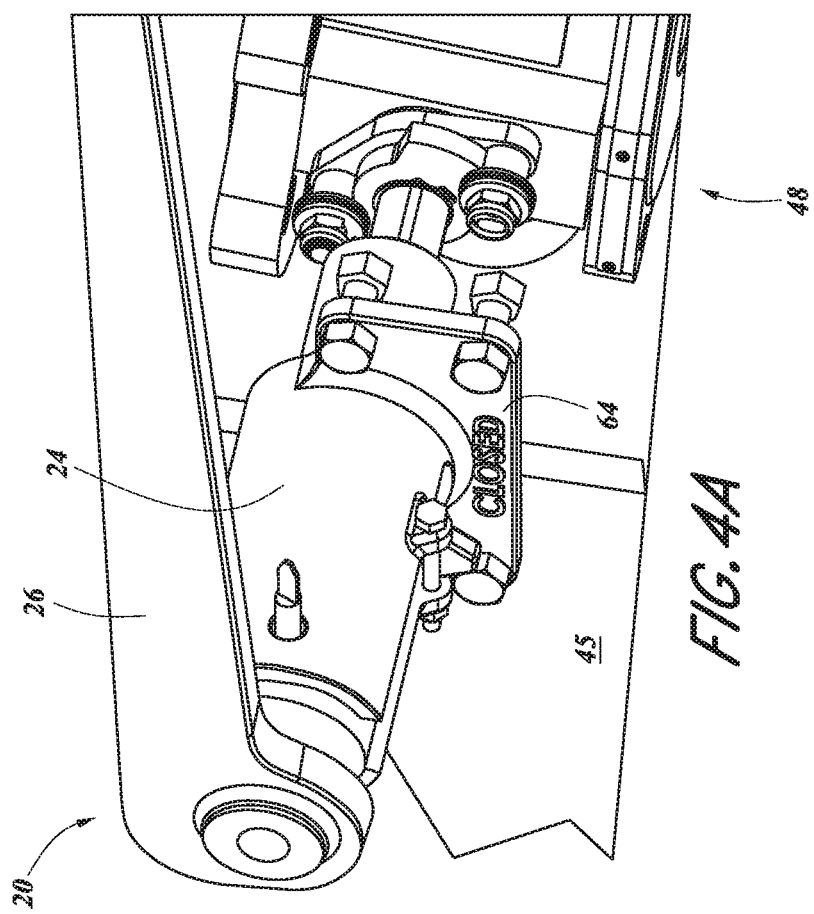

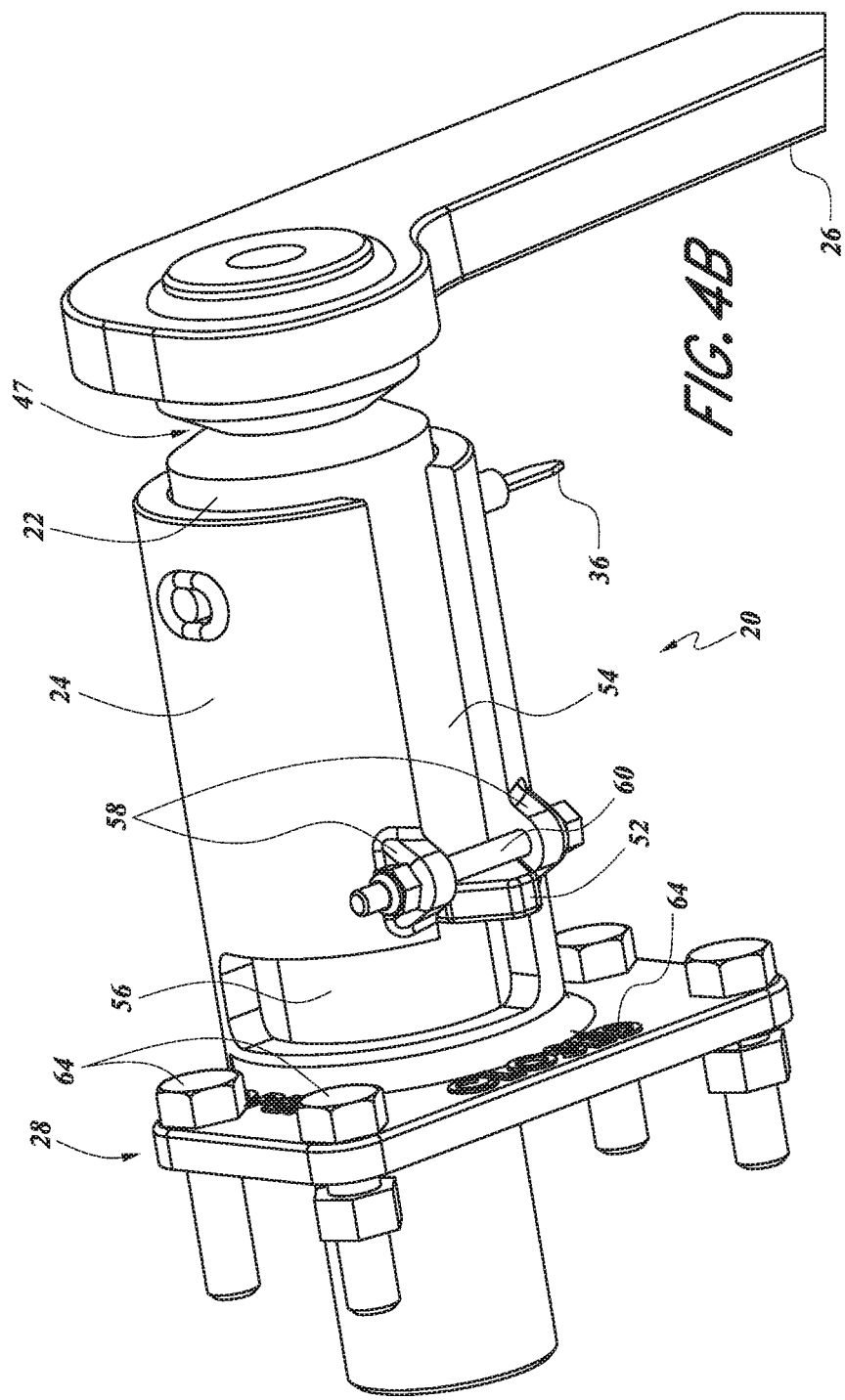

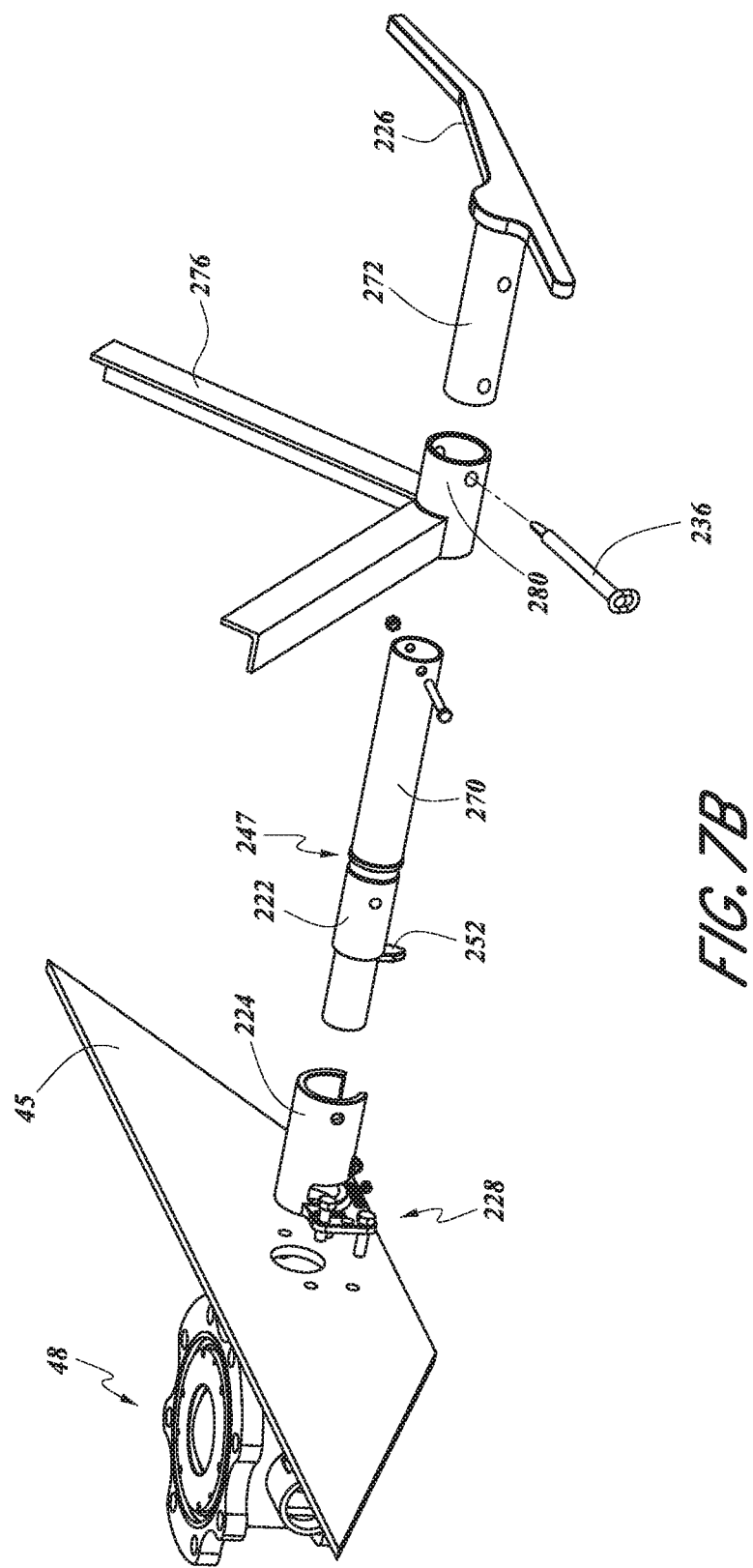

VALVE ACTUATOR FOR RAILWAY TANK CAR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

Certain embodiments disclosed herein relate generally to a valve actuator. The valve actuator can be a bottom valve actuator for a railway tank car, though it will be understood that it can be used in other applications as well.

Description of the Related Art

Railway tank cars are designed to transport liquid and gaseous commodities. Tank cars can be pressurized or non-pressurized, insulated or non-insulated, and designed for single or multiple commodities. Tank cars can have various valves, hatches, or other types of closable openings on the top and the bottom. As one example, bottom valves located on the bottom of the tank car can be used to remove material within the tank or hull of the tank car.

SUMMARY

In recent years there has been a growing need to provide safety improvements in tank car. For example, there is a need to improve valve actuators on tank cars so that the valves do not open prematurely after an accident.

In some embodiments, a valve actuator can have a locked and unlocked position and include shearing features on the handle to break on impact without unlocking the valve. The valve actuator can be a bottom valve actuator.

In some embodiments, valve actuator can be used in connection with valves on railway tank cars.

According to some variants, a valve actuator can be actuatable to selectively engage a valve stem of a valve assembly, the valve actuator having a weakened portion configured to fail upon an impact without transmitting a force onto the valve stem.

In some embodiments, the valve actuator can be optionally used in connection with rail cars. Optionally, the weakened portion shears before impact forces (e.g., from an accident) on the valve actuator (e.g., on the handle) are imparted on the valve stem. In some cases, the weakened portion is defined by a groove. In some configurations, the weakened portion is defined by a relatively thinner wall portion of the valve actuator shaft than other portions of the shaft. In some embodiments, the valve actuator does not rotate the valve stem when in partially engaged position to valve stem. In some embodiments, the valve actuator rotates the valve stem when in a fully engaged position with the valve stem. In some embodiments, the valve actuator is biased away from the valve stem.

According to some variants, a valve actuator (e.g., for a railway car valve) includes an elongate shaft. The elongate shaft can have a first end, a second end, and a length extending therebetween. In some embodiments, the second end of the elongate shaft comprising a cavity. The cavity can extend from the second end through a portion of the length of the elongate shaft. In some embodiments, the cavity can receive and engage with a valve stem of a valve assembly. The elongate shaft can include a weakened portion between the first and second ends. In some embodiments, the valve actuator includes a handle. The handle can be connected to the first end of the elongate shaft and can to facilitate rotations of the elongate shaft about a rotation axis. The valve actuator can include an elongate tube. The elongate tube can receive the second end of the elongate shaft. In some embodiments, the elongate tube includes a first open end and a second open end. In some embodiments, the valve actuator includes a biasing member. The biasing member can have a first end configured to engage a valve stem of a valve assembly and a second end configured to engage a portion of the elongate shaft within the cavity. In some embodiments, the biasing member is configured to bias the elongate shaft away from the valve stem.

In some embodiments, the elongate shaft is configured to transition between a partially engaged position and a fully engaged position. In some embodiments, the elongate shaft is configured to inhibit accidental rotation of a valve stem when in the partially engaged position. In some embodiments, the elongate shaft is configured to be incapable of rotating a valve stem when in the partially engaged position. In some cases, the elongate shaft is configured to be capable of rotating a valve stem when in a fully engaged position. In some embodiments, the biasing member biases the elongate shaft toward the partially engaged position.

According to some variants, a valve actuator (e.g., for a railway car valve) includes: an elongate shaft having a first end, a second end, and a length extending from the first end to the second end. The elongate shaft can include a weakened portion between the first and second ends. In some embodiments, the elongate shaft includes a protrusion extending outward from an outer surface of the elongate shaft. The second end of the elongate shaft can comprise a cavity extending from the second end through a portion of the length of the elongate shaft and configured to receive and engage with a valve stem of a valve assembly. In some embodiments, the valve actuator includes an elongate tube configured to receive the second end of the elongate shaft. The elongate tube can include a first open end, a second open end, and a length extending from the first end to the second end. In some embodiments, the elongate tube includes a first slot extending from the first open end along a portion of the length of the elongate tube. The first slot can be configured to receive the protrusion of the elongate shaft. In some embodiments, the elongate tube includes a second slot extending from the first slot in a direction non-parallel to the length of the elongate tube. The second slot can be configured to receive the protrusion of the elongate shaft. In some embodiments, the first slot is configured to interfere with the protrusion and inhibit rotation of the elongate shaft when the elongate shaft is in a locked position. In some cases, the second slot is configured to permit rotation of the elongate shaft to open a valve when the elongate shaft is in an unlocked position.

BRIEF DESCRIPTION OF THE DRAWINGS

Various embodiments are depicted in the accompanying drawings for illustrative purposes, and should in no way be interpreted as limiting the scope of the inventions, in which like reference characters denote corresponding features consistently throughout similar embodiments.

FIG. 2A is a perspective view of a valve actuator.

FIG. 4A is a perspective view of the valve actuator of FIG. 2A connected to a valve in a first position.

FIG. 4B is a close-up perspective view of the valve actuator of FIG. 2A connected to a valve in the first position.

FIG. 7B is an exploded view of the valve actuator and valve of FIG. 7A.

DETAILED DESCRIPTION

A valve actuator can have a first and a second position that can correspond with a locked and unlocked position of a valve. The valve can be on a railway tank car for example and may be found on or at a bottom of a tank car. Among other features, the valve actuator can include shearing features on a handle to break on impact without unlocking the valve. It will be understood that though the valve actuator is described with reference to a railway tank car it can also be used in other applications. For example, the actuator can be used on other types of vehicles and on stationary objects.

In some embodiments, a valve actuator for a railway tank car can have a locked and unlocked position and include shearing features on the handle to break on impact without unlocking the valve. In some cases, low grade bolts can be used in addition to other shearing features to facilitate shearing of the handle and/or other portions of the valve actuator upon impact. The valve actuator can be a bottom valve actuator.

Figure 1A:
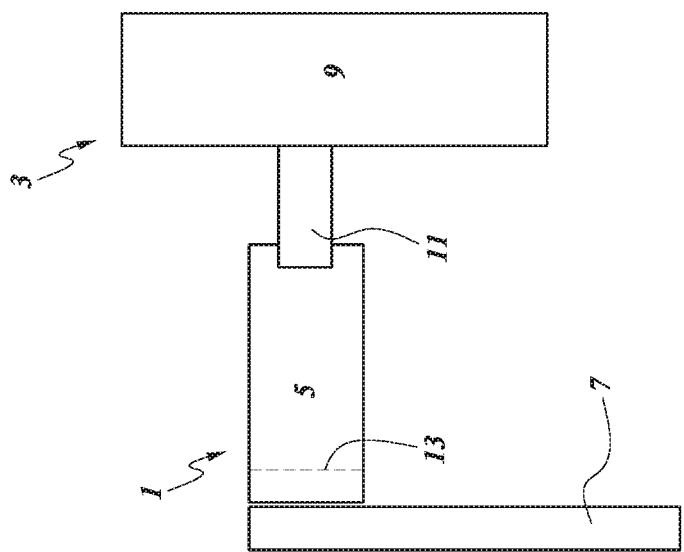
FIG. 1A is a schematic representation of an embodiment of a valve actuator and valve assembly.

FIG. 1A illustrates a valve actuator 1 connected to a valve assembly 3 in a first position (e.g., a locked and/or partially engaged position). The valve actuator 1 can include an elongate shaft 5. In some embodiments, the valve actuator 1 includes a handle 7 or other actuation mechanism connected to an end of the valve shaft 5. The valve shaft 5 or some other portion of the valve actuator 1 can include a weakened portion or shearing feature 13. The shearing feature 13 may be, for example, a portion having a smaller cross-section than other portions of the elongate shaft 5. In some embodiment, the shearing feature 13 is a thinning of material that may not form a visible or clearly defined groove, and/or a plurality of holes to create a weakened section.

The valve assembly 3 can include a valve body 9 and a valve stem 11. The valve stem 11 can extend from the valve body 9. As illustrated, the valve actuator 1 (e.g., the elongate shaft 5) can be configured to engage the valve stem 11. For example, the elongate shaft 5 can include a cavity or protrusion that can mate with a protrusion or cavity on the valve stem 11.

Figure 1B:
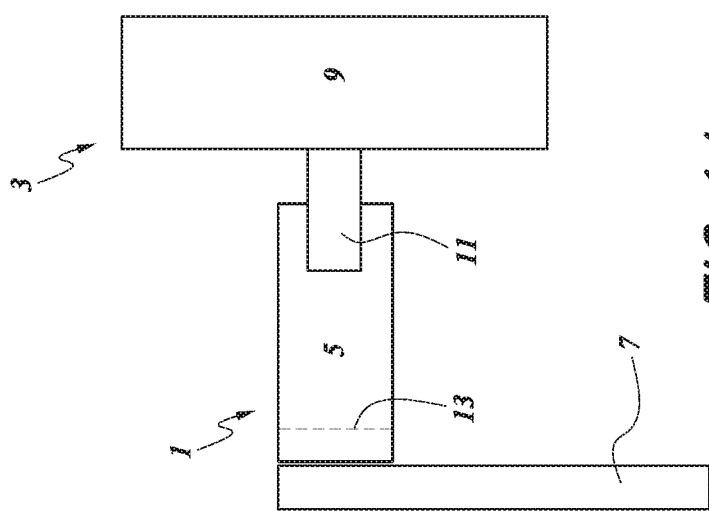
FIG. 1B is a schematic representation of the valve actuator of FIG. 1A in a second position with respect to the valve assembly.

FIG. 1B illustrates the valve actuator 1 connected to the valve assembly 3 in a second position (e.g., an unlocked and/or fully engaged position). As illustrated, the elongate shaft 5 or some other portion of the valve actuator 1 can be brought into further engagement with the valve stem 11 when the valve actuator 1 is in the second position. In some embodiments, the valve actuator 1 can prevent inadvertent rotation of the valve stem 11 when in the partially engaged position. Additionally or alternatively, the valve actuator 1 can be incapable of rotating the valve stem 11 when in the partially engaged position. Full engagement of the valve actuator 1 with the valve stem 11 (e.g., in the fully engaged position) can facilitate rotation of the stem 11 and/or opening of the valve 3 via rotation of the elongate shaft 5.

FIG. 2A illustrates a first embodiment of a valve actuator 20. As illustrated, the valve actuator 20 can include an elongate shaft 22. The actuator 20 can include a handle 26 connected to one end (e.g., a first end) of the elongate shaft 22. In some embodiments, the handle 26 is formed as an integral part with the elongate shaft 22.

The valve actuator 20 can include an elongate sleeve or tube 24. The elongate tube 24 can receive at least a portion of the elongate shaft 22. In some embodiments, the inner and/or outer shape of the elongate tube 24 is formed to match the outer shape of the elongate shaft (e.g., one or more of the shapes can be circular). The valve actuator 20 can include a mating interface 28. The mating interface 28 can facilitate connection between the valve actuator 20 and a portion of a tanker car or other structure having a valve. The mating interface 28 can be, for example, a plate 30 with holes through which fasteners 32 may be inserted. In some embodiments, the plate 30 is formed as an integral part with the elongate tube 24. In some cases, the plate 30 is connected to an end of the elongate tube 24 via welding, adhesives, fasteners, and/or otherwise.

Figure 2B:
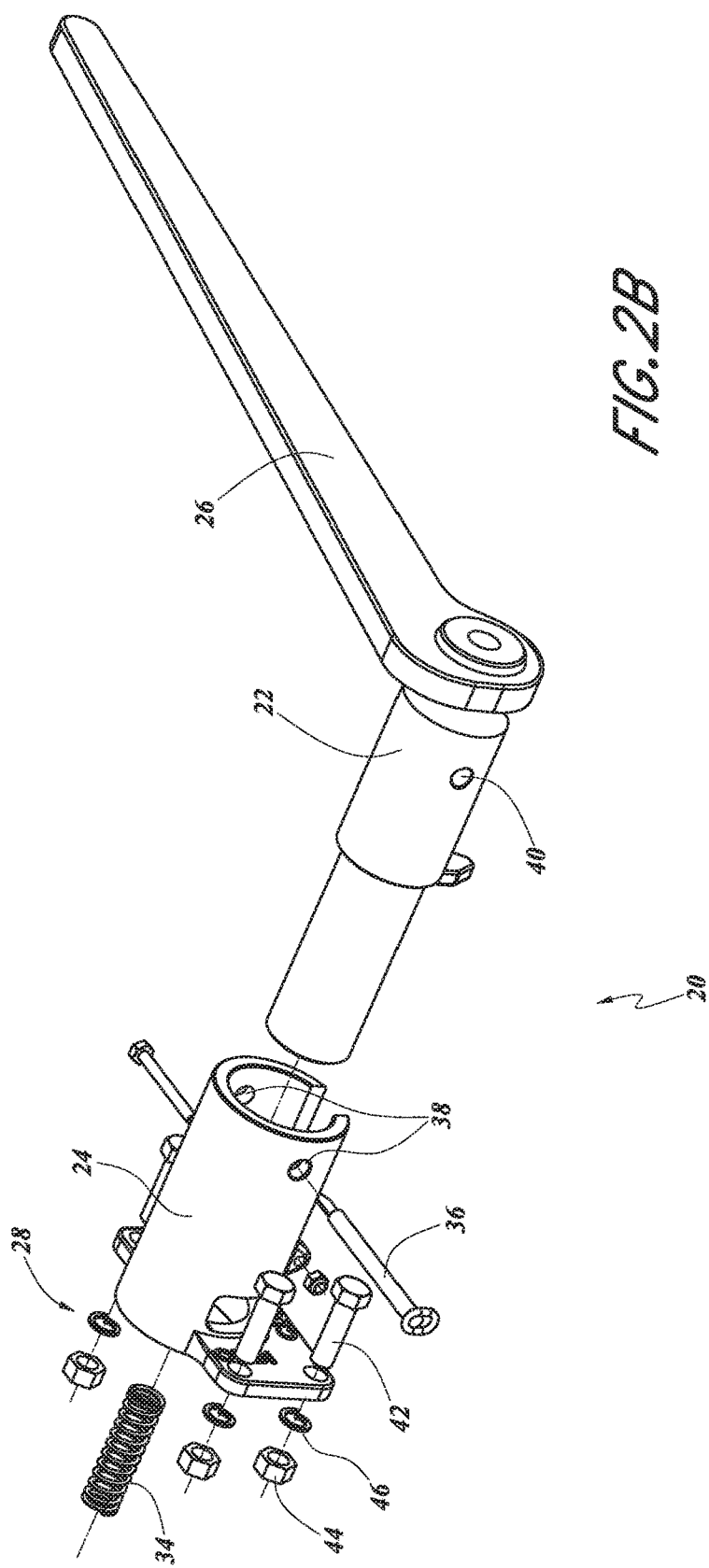
FIG. 2B shows an exploded view of the valve actuator of FIG. 2A.

FIG. 2B illustrates an exploded view of the actuator 20 of FIG. 2A. As illustrated, the actuator 20 can include a spring 34. The spring 34 can be positioned partially or entirely within a cavity in the elongate shaft 22. The mating interface 28 can include a plurality of bolts 42, nuts 44, and/or washers 46 (e.g., lock washers).

The valve actuator 20 can include a lock pin 36. The elongate tube 24 can include one or more pin holes 38 sized to receive the lock pin 36. The elongate shaft 22 can also include one or more pin holes 40 also sized to receive the lock pin 36. The valve actuator 20 can be configured such that the pin holes 38, 40 of the elongate tube 24 and elongate shaft 22 align when the valve actuator 20 is in a locked (e.g., partially connected) position.

Figure 3A:
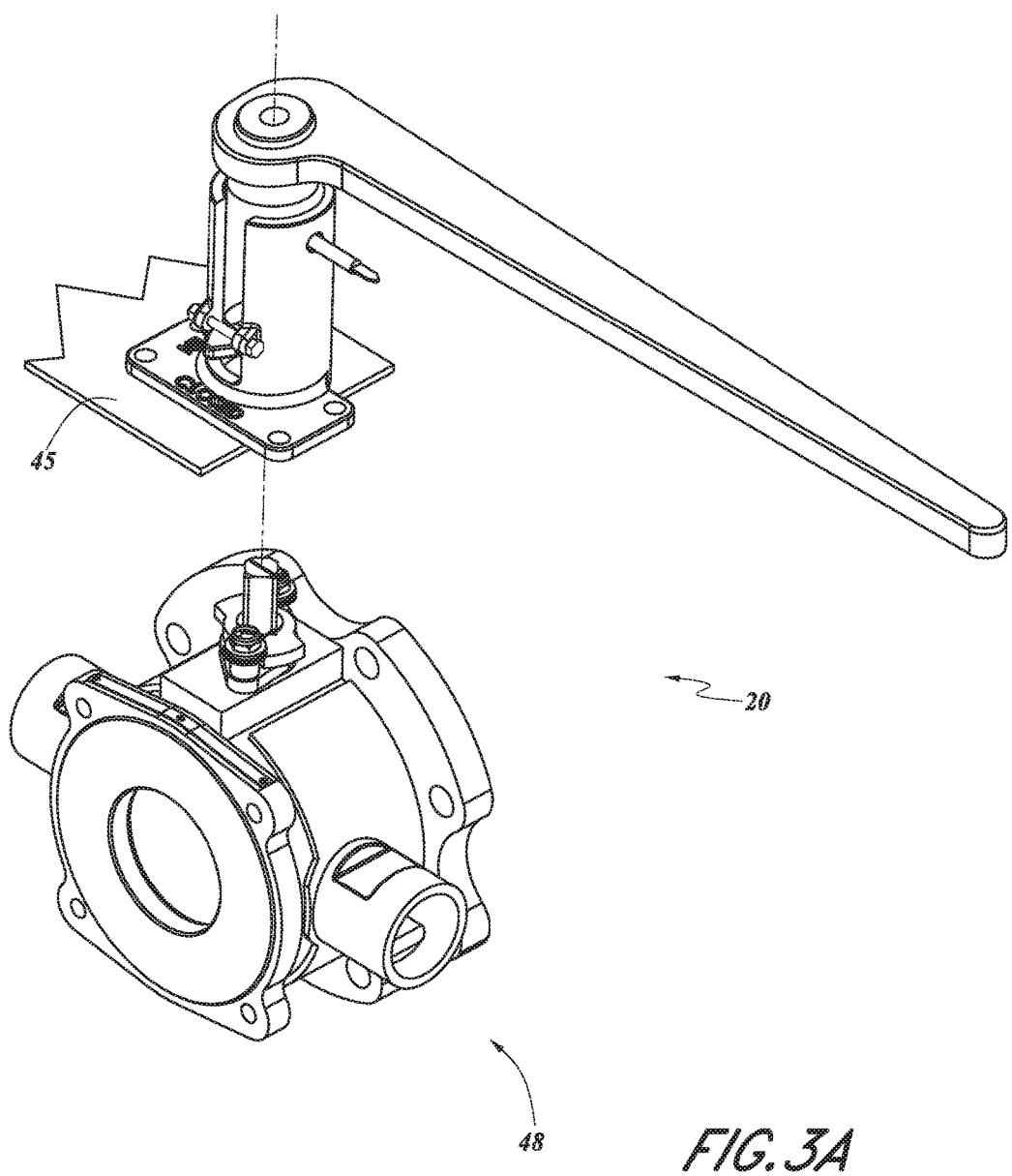
FIG. 3A is a front view of the valve actuator of FIG. 2A connected to a valve in a first application.
Figure 3B:
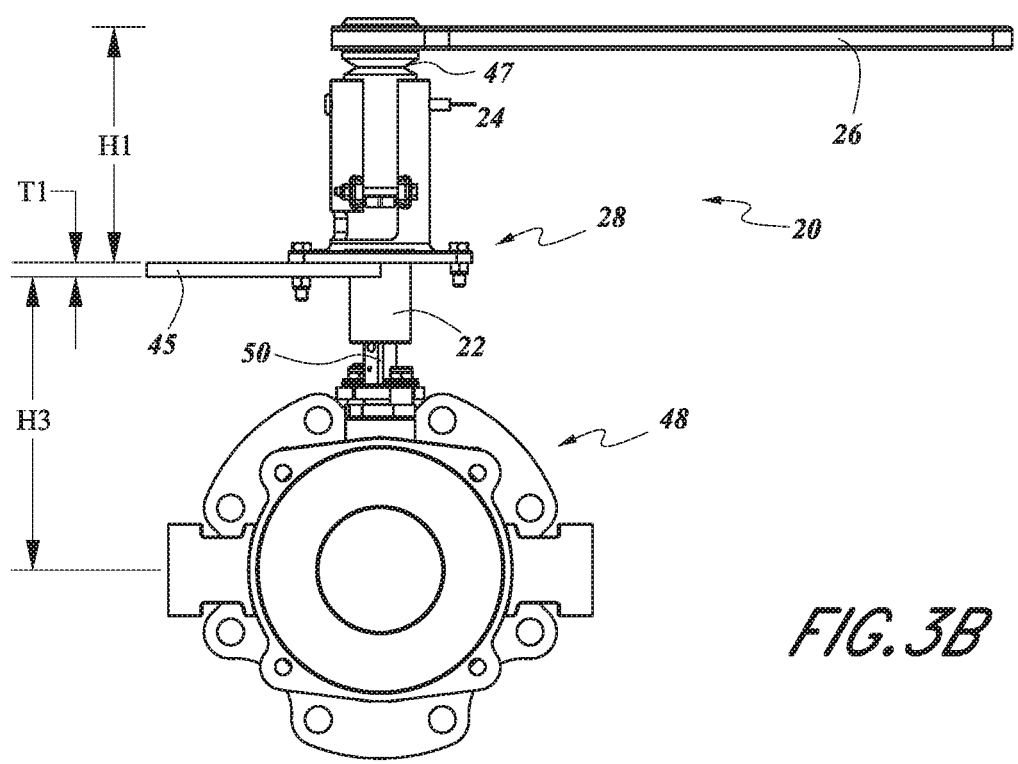
FIG. 3B is a perspective view of the valve actuator of FIG. 2A connected to a valve in a first application.

As illustrated in FIGS. 3A-3B, the valve actuator 20 can be connected to a valve assembly 48. In some embodiments, the valve actuator 20 is connected to a portion of the tank car or other structure in which the valve assembly 48 is located. For example, the mating interface 28 can be connected to a wall 45 (e.g., a skid) of a tank car via welding, adhesives, fasteners, and/or other attachment structures or methods. In some embodiments, low-grade bolts are used to attach the mating interface 28 to the wall 45. Use of low-grade bolts can provide a safety feature in that the bolts can be configured to fail in the event of high impact to the handle 26 or to some other portion of the valve actuator 22 before the force of the impact reaches the valve stem 50.

The elongate shaft 22 can be connected to a valve stem 50 of the valve assembly 48. The connection between the valve stem 50 and elongate shaft 22 can be non-load-bearing. For example, as discussed in further detail below, the valve stem 50 can extend into a cavity in the elongate shaft 22. The valve stem 50 and elongate shaft 22 can be free to move with respect to each other in a direction parallel to the length of the valve stem 50.

Also illustrated in FIG. 3B is a shearing feature or weakened portion 47 of the elongate shaft 24. This weakened portion 47 can be a portion of the elongate shaft 24 having a reduced diameter. In some embodiments, the weakened portion 47 is a thinning of material that may not form a visible or clearly defined groove, and/or a plurality of holes to create a weakened section. The weakened portion 47 can be positioned along the length of the elongate shaft 24 between the elongate tube 24 and the handle 26. The weakened portion 47 can function in a manner similar to or the same as the shearing feature 13 described above.

The relative heights/thickness of the valve actuator 20 and the valve assembly 48 are illustrated in FIG. 3B. For example, the handle 26 can be positioned at a height H1 from the wall 45 of the tank car. This height H1 can, for example, range from between 5-10 inches, between 6-11 inches, between 4-8 inches, between 7-15 inches, and/or between 8-9.5 inches. Other height H1 values above and below these ranges are also possible. The wall 45 can be positioned at a height H2 from the centerline of the valve assembly 48. The height H2 can be, for example, between 5-10 inches, between 6-11 inches, between 4-8 inches, between 7-15 inches, and/or between 8-10 inches. As with the height H1, the height H2 can vary above and below these stated ranges. The thickness of the wall 45 can be 0.25-2 inches and preferably approximately 0.5 inches.

Figure 4C:
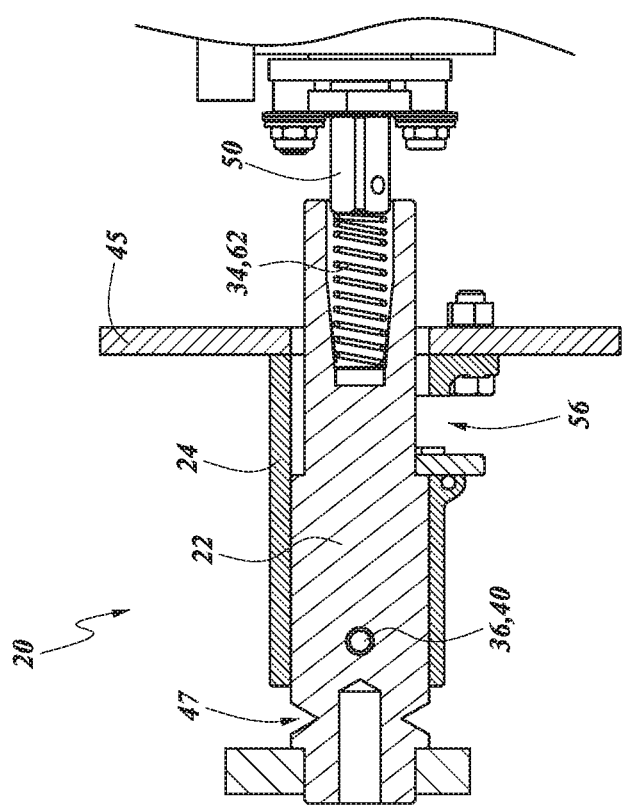
FIG. 4C is a cross-sectional view of the valve actuator and valve of FIG. 4A.

FIGS. 4A-4C illustrate the valve actuator 20 connected to the valve assembly 48 in a first position (e.g., a partially connected or locked position). The valve actuator 20 can be configured such that force applied to the handle 26 will not be translated to the valve stem 50, or at least insufficient force to rotate the valve stem 50 will be translated to the valve stem 50 when the valve actuator 20 is in the first position. For example, the weakened portion 47 can be configured to shear (e.g., fail) before the valve actuator 20 rotates the valve stem 50 when the valve actuator 20 is in the first position. The weakened portion 47 can inhibit or prevent damage to the valve stem 50 resulting from high impact to the handle 26 or other portion of the elongate shaft 22 when the valve actuator 20 is in the first position. For example, in some embodiments, the torque required to disfigure or damage the valve stem 50 is 750 ft./lbs., and the torque required to shear the handle 26 from the elongate shaft 22 at the weakened portion 47 is 500 ft./lbs. or less. In some embodiments torque required to shear the handle 26 can be ⅘, ⅔, ⅗, ½, ⅓, or less than the torque required to disfigure or damage the stem 50.

As illustrated in FIG. 4B, the valve actuator 20 can include various features configured to maintain the valve actuator 20 in the first position. For example, the locking pin 36 and corresponding pin holes of the shaft and tube 22, 24 can inhibit rotation of the shaft 22 with respect to the tube 24 and stem 50. The pin 36 can also inhibit translation of the elongate shaft 22 toward and away from the stem 50 (e.g., in a direction parallel to a length of the stem 50 and/or a length of the shaft 22).

In some embodiments, the elongate shaft 22 includes a protrusion 52 extending from the outer surface of the elongate shaft 22. The protrusion 52 can fit within a first channel 54 in the elongate tube 24. The walls of the channel 54 can interfere with the protrusion 52 in a circumferential direction to inhibit or prevent rotation of the shaft 22 with respect to the elongate tube 22 when the actuator 20 is in the first position. The elongate tube 24 can include a second slot 56 connected to the first slot 54 and extending therefrom in a direction non-parallel to the lengths of the tube 24 and shaft 22. The second slot 56 can be connected to the first slot 54 on an end of the first slot 54 furthest from the handle 26. As illustrated in FIGS. 4A-4B, the valve actuator 20 can include labels 64 to provide visual confirmation of the configuration of the valve assembly (e.g., opened and/or closed) when aligned with the protrusion 52.

In some embodiments, the valve actuator 20 includes structure configured to inhibit or prevent inadvertent removal/disengagement of the elongate tube 22 from the elongate shaft 24. For example, the elongate shaft 24 can include a retention mechanism configured to interfere with the protrusion 52 in a direction away from the valve stem 50. The retention mechanism can include, for example, one or more brackets, bars, or other structures spanning at least a portion of a width of the first channel. As illustrated, the retention mechanism can include two brackets 58 configured to mate with a bolt or rod 60. The rod 60 can span the width of the first channel 54 and interfere with movement of the protrusion 52 in a direction away from the valve stem 50. The retention mechanism (e.g., rod 60) can be positioned on a side of the protrusion 52 opposite the second channel 56 and/or opposite the valve stem 50. The rod 60 may be removed (e.g., via removal of a nut or other attachment structure) to facilitate assembly and/or disassembly of the valve actuator 20. In some embodiments, the protrusion 52, retention mechanism, and/or the lock pin 36 are the only attachment structures connecting the elongate shaft 22 to the elongate tube 24.

As illustrated in FIG. 4C, the elongate shaft 22 can include a cavity 62. The cavity 62 can be positioned at the end of the elongate shaft 22 opposite the handle 26. The cavity 62 can be sized and shaped to accommodate the spring 34. The spring 34 can be positioned and or configured such that one end of the spring 34 abuts a wall of the cavity 62 and the other end of the spring 34 abuts a portion of the valve stem 50. The cavity 62 can be configured to receive a portion of the valve stem 50 when the valve actuator 20 is in the first position. The valve stem 50 and cavity 62 can interface with each other in a keyed-relationship wherein the cross-sectional shape of the cavity 62 is similar to or the same as the cross-sectional shape of the valve stem 50 along at least a portion of the depth of the cavity 62. The cross-sectional shapes of the cavity 62 and stem 50 can be non-circular and/or polygonal. For example, the stem 50 can have a square cross-section corresponding to a square cross-section of at least a portion of the cavity 62.

In some embodiments, the interface (e.g., overlap) between the valve stem 50 and the cavity 62 can be minimal such that rotation of the elongate shaft 22 will not rotate the valve stem 50 when the valve actuator 20 is in the first (e.g., partially engaged) position. For example the overlap between the valve stem 50 and the cavity 62 can be less than ½ inches, less than ⅖ inches, less than ⅜ inches, and/or less than ¼ inches. Minimal overlap between the valve stem 50 and the cavity 62 can permit the stem 50, cavity 62, and/or spring 34 to function as a slip-clutch at torques equal to or greater than the torque required to rotate the valve stem 50. Variations of overlap greater than or less than the ranges described can be utilized while realizing the benefits of the disclosed ranges.

Figure 5A:
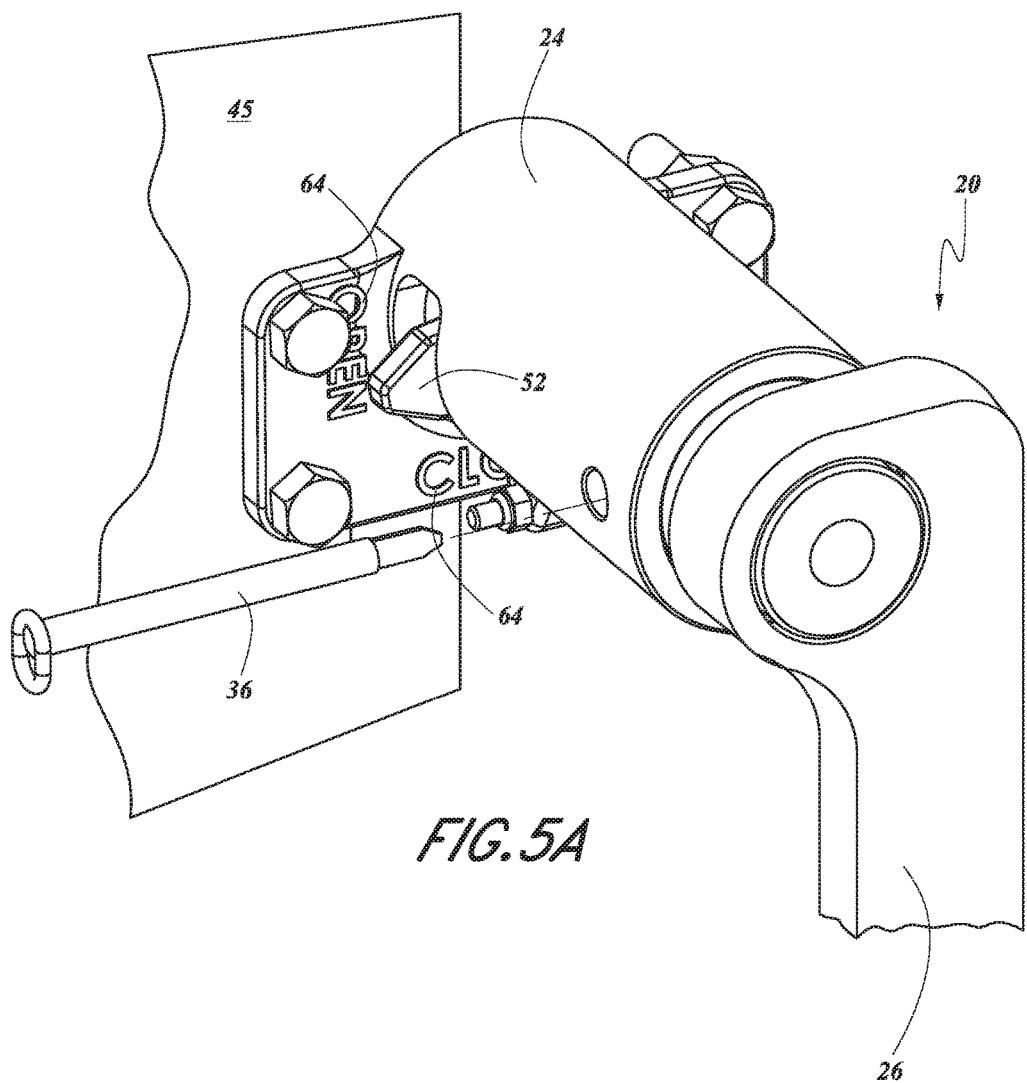
FIG. 5A is a perspective view of the valve actuator of FIG. 2A connected to a valve in a second position.
Figure 5B:
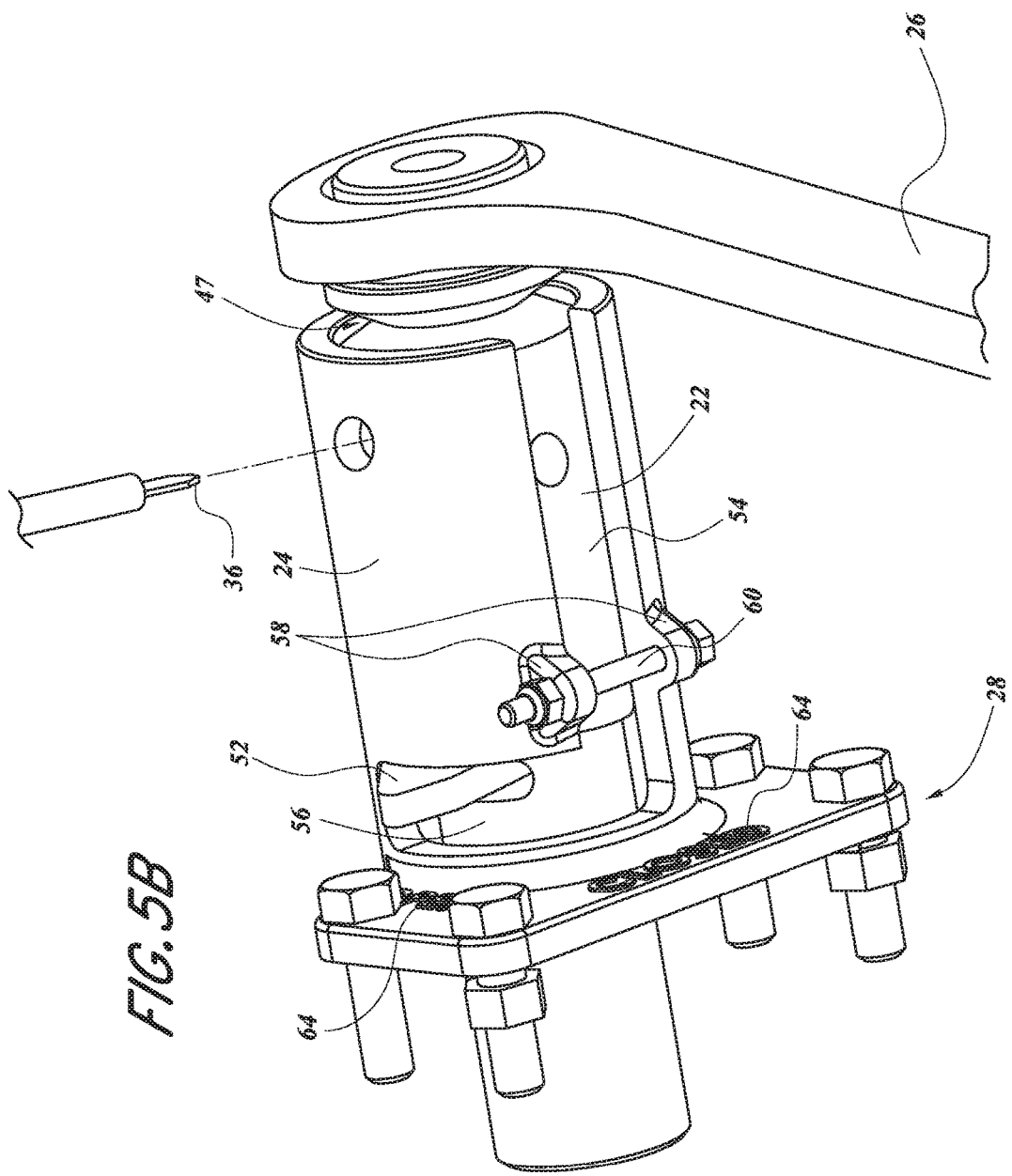
FIG. 5B is a close-up perspective view of the valve actuator of FIG. 2A connected to a valve in the second position.
Figure 5C:
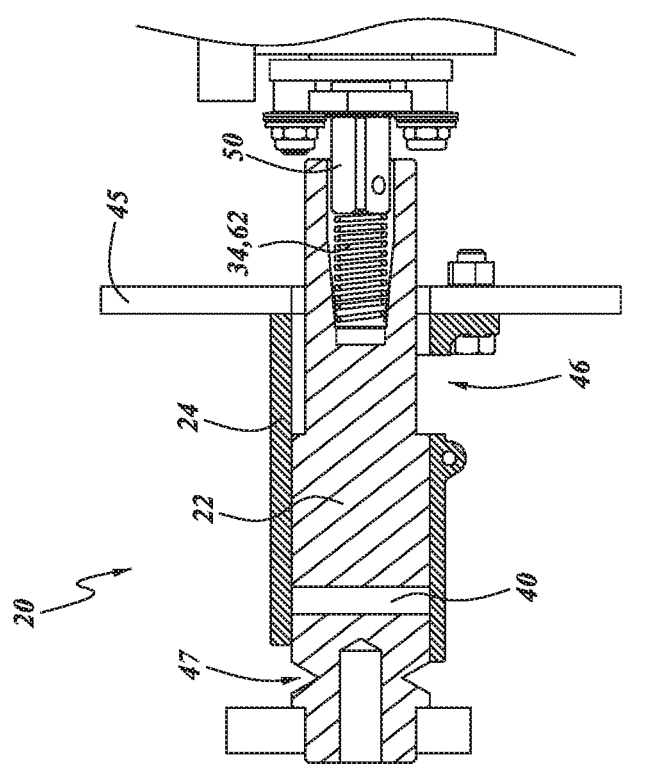
FIG. 5C is a cross-sectional view of the valve actuator and valve of FIG. 5A.

FIGS. 5A-5C illustrate an example of a process for transitioning the valve actuator 20 to a second (e.g., unlocked or fully engaged) position with respect to the valve stem 50. The process can include removing the lock pin 36 from the pin holes 38, 40 of the shaft 22 and tube 24, respectively. A user can then push the elongate shaft 22 toward the valve stem 50. In some cases, the user must push with sufficient force to overcome the biasing force of the spring 34. Pushing the elongate shaft 22 toward the stem 50 can move the protrusion 52 along the first channel 54 and into the second channel 56.

Positioning the protrusion 52 within the second channel 56 can signal transition of the valve actuator 20 to the unlocked position (e.g., the second position). In some cases, as illustrated in FIG. 5C, the overlap between the cavity 62 and the valve stem 50 when the valve actuator 20 is in the unlocked position is greater than the overlap when the valve actuator 20 is in the locked position. For example, the overlap can be at least 1 inch, at least 1.25 inches, at least 1.5 inches, at least 2 inches, and/or at least 3 inches. Overlap in the above-recited ranges can overcome the slip-clutch tendencies between the valve stem 50 and the elongate shaft 22 and facilitate a rotationally-locked relationship between the valve stem 50 and the elongate shaft 22. In some cases, overlap of less than 1 inch can facilitate a rotationally-locked relationship between the valve stem 50 and the elongate shaft 22.

Achieving rotational-locking between the valve stem 50 and the elongate shaft 22 can facilitate rotation of the valve stem 50 via rotation of the elongate shaft 22. Such rotation of the valve stem 50 can transition the valve assembly 48 to an opened configuration. In some embodiments, such rotation transitions the protrusion 52 from one label 64 (e.g., "closed") to another label 64 (e.g., "opened") as the protrusion 52 travels through the second channel 56. In some embodiments, the rotational distance between the closed and opened labels 64 is approximately 90 degrees.

Transitioning the valve actuator 20 from the unlocked position to the locked position can include rotating the elongate shaft 22 such that the protrusion 52 is aligned with the first channel 54 of the elongate tube 54. Such rotation of the elongate shaft 22 can rotate the valve stem 50 to close the valve assembly 48. When the protrusion 52 is aligned with the first channel 54, one or more of the biasing force of the spring 34 and a pulling force imparted by the user can move the elongate shaft 22 away from the valve stem 50 to the partially-engaged position. The user can insert the pin through the pin holes 38, 40 to lock the valve actuator 20 in the locked position. In some embodiments, additional pins, collars, or other locking mechanisms may be used to lock the valve actuator 20 in the locked position.

Figure 6A:
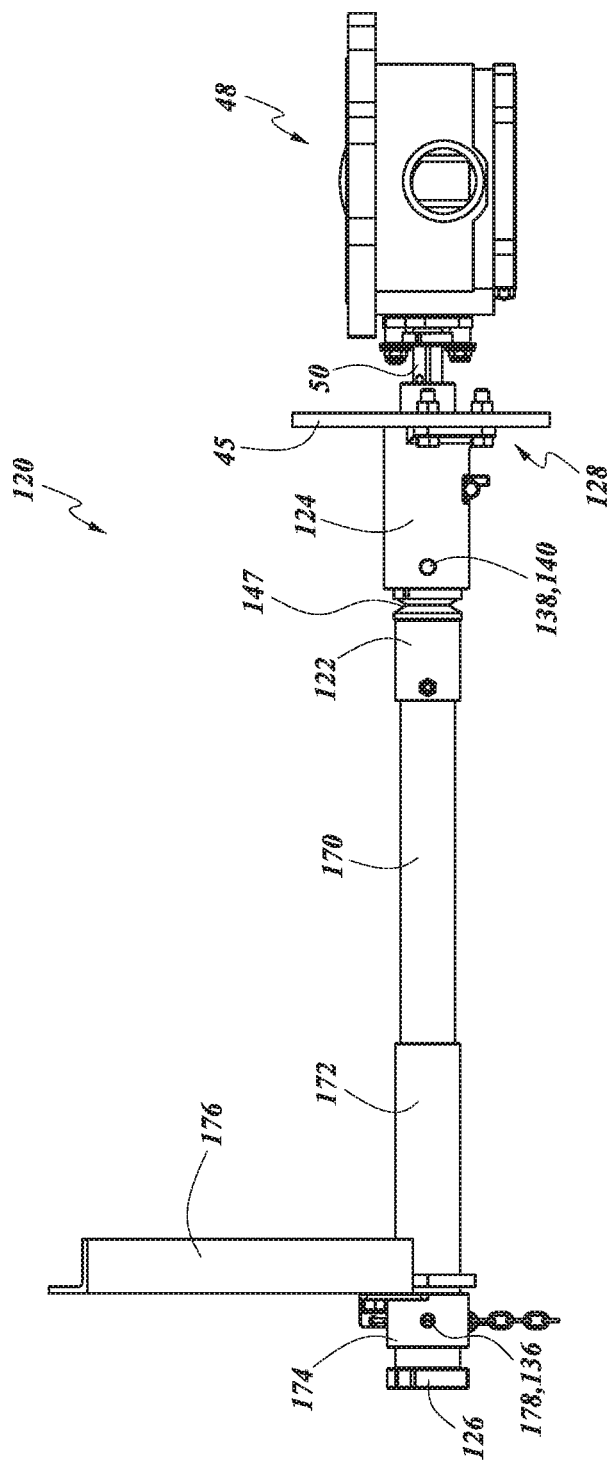
FIG. 6A is a front view of a second embodiment of a valve actuator connected to a valve.
Figure 6B:
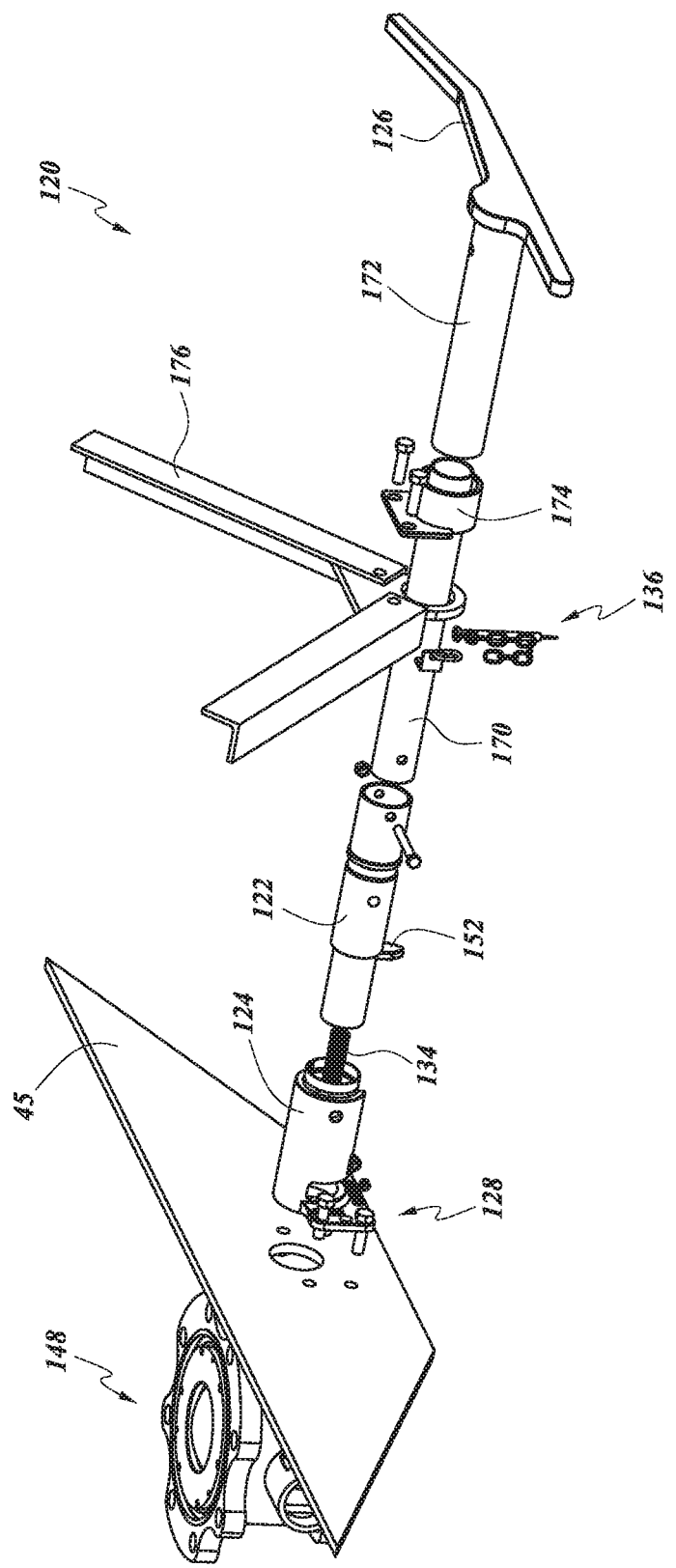
FIG. 6B is an exploded view of the valve actuator and valve of FIG. 6A.

FIGS. 6A-6B illustrate an embodiment of a valve actuator 120 that is similar to or the same as the valve actuator 20 discussed above. For example, the valve actuator 120 includes a handle 126 that can be the same as the handle 26 described above. Similar or identical feature shared between the valve actuator 120 and the valve actuator 20 are designated by reference numbers in which a "1" is added to the beginning (e.g., handle 126 v. handle 26) and may be assumed to have the same or similar functional and/or structural feature as the corresponding structures described above, unless otherwise noted.

As illustrated in FIGS. 6A and 6B, the valve actuator 120 can include a shaft extender 170. The shaft extender 170 can be connected to one end of the elongate shaft 122. For example, the shaft extender 170 can be connected to the end of the elongate shaft 122 opposite the valve stem 50. In some embodiments, the shaft extender 170 is connected to the elongate shaft 122 via welding, adhesives, fasteners, and/or some other attachment method or structure. In some embodiments, the elongate shaft 122 is formed as an integral part with the shaft extender 170.

In some embodiments, the shaft extender 170 can increase a distance between the handle 126 and the wall 45. In some cases, the distance between the handle 176 and the wall 45 is at least 12 inches, at least 16 inches, at least 22 inches, at least 30 inches, at least 36 inches, and/or at least 40 inches. Enabling such distances can increase the utility of the valve actuator 120 in installation sites having greater distances between the valve assembly 48 and an exterior structure (e.g., wall, support, or other structure) of the installation site (e.g., a train car).

As illustrated in FIG. 6B, the valve actuator 120 can include a handle extension 172 connected to and extending from the handle 126. The handle extension 172 can have a tubular and/or hollow structure which can fit around and receive at least a portion of the shaft extender 170. In some embodiments, the handle extension 172 is a solid and/or cylindrical structure which can fit at least partially within the shaft extender 170. The extent to which the handle extension 172 and the shaft extender 170 overlap can affect the overall length of the valve actuator 120 (e.g., the distance between the handle 126 and the wall 45). In some embodiments, the shaft extender 170 can be cut to accommodate installation sites requiring shorter valve actuators 120. In some embodiments, the handle extension 172 is connected to the shaft extender 170 via welding, fasteners, adhesives, and/or additional attachment structures and/or methods.

In some embodiments, the valve actuator 120 includes a bracket 174 configured to fit around the handle extension 172 and/or shaft extender 170. The bracket 174 can attach to a support (e.g., a V-bracket 176) of an installation site (e.g., a train car). For example, the bracket 174 can attached to the V-bracket 176 of a train car via one or more fasteners and/or via welding. In some embodiments, the bracket 174 can connect to an existing and/or standard V-bracket 176 found on train cars.

The V-bracket, handle extension 172, and/or shaft extender 170 can include pin holes which can receive a lock pin 136. Insertion of the lock pin 136 through these pin holes can maintain the valve actuator 120 in a locked position as described above with respect to the lock pin 36 and valve actuator 20. Transition of the valve actuator 120 can be accomplished in a manner similar to or in the same as the manner described above with respect to valve actuator 20.

Figure 7A:
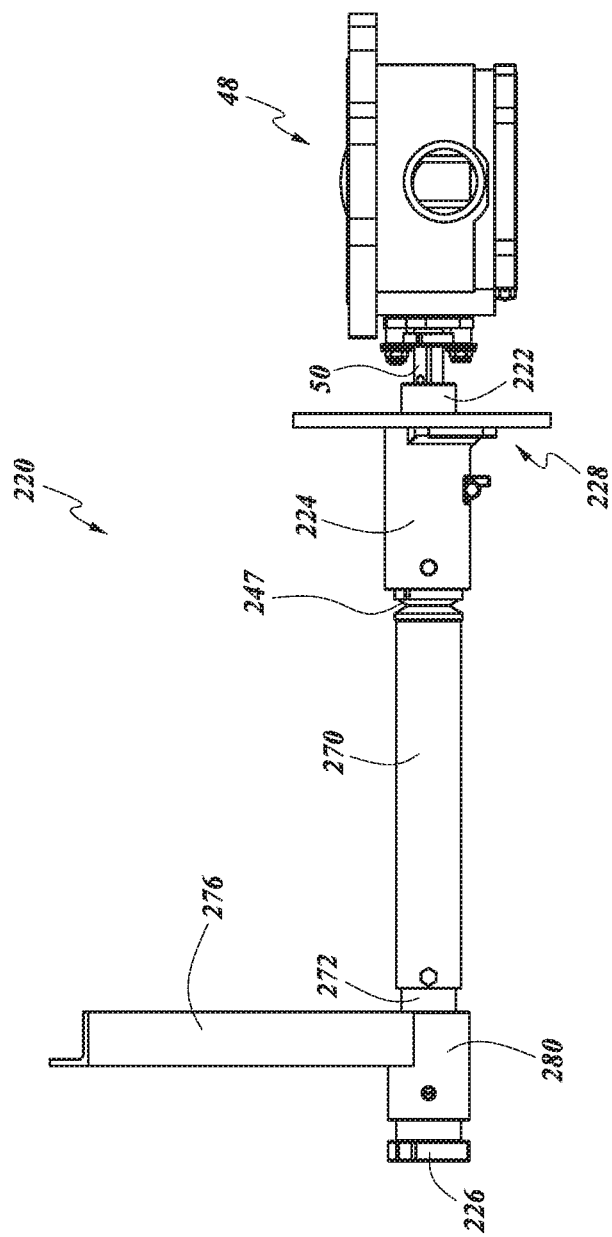
FIG. 7A is a front view of a third embodiment of a valve actuator connected to a valve.

FIGS. 7A-7B illustrate an embodiment of a valve actuator 220 that is similar to or the same as the valve actuator 20 discussed above. For example, the valve actuator 220 includes a handle 226 that can be the same as the handle 26 described above. Similar or identical feature shared between the valve actuator 220 and the valve actuator 20 are designated by reference numbers in which a "2" is added to the beginning (e.g., handle 226 v. handle 26) and may be assumed to have the same or similar functional and/or structural feature as the corresponding structures described above, unless otherwise noted.

As illustrated in FIG. 7B, the valve actuator 220 can include a shaft extender 270. The shaft extender 270 can connect to an end of the elongate shaft 222 opposite the valve stem 50. In some embodiments, the shaft extender 270 is connected to the elongate shaft 222 via welding, adhesives, and/or one or more fasteners or other attachment structures or methods. As illustrated, the weakened portion 247 of the valve actuator 220 can be positioned at or near the interface between the shaft extender 270 and the elongate shaft 222. In some embodiments, the weakened portion 247 positioned on either the shaft extender 270 or elongate shaft 222.

In some embodiments, the shaft extender 270 can increase a distance between the handle 226 and the wall 45. In some cases, the distance between the handle 276 and the wall 45 is at least 12 inches, at least 16 inches, at least 22 inches, at least 30 inches, at least 36 inches, and/or at least 40 inches. Enabling such distances can increase the utility of the valve actuator 220 in installation sites having greater distances between the valve assembly 48 and an exterior structure (e.g., wall, support, or other structure) of the installation site (e.g., a train car).

In some embodiments, the valve actuator includes a support (e.g., a V-Bracket 276) which can connect to the train car or other installation site. In some embodiments, the V-Bracket 276 includes a sleeve portion 280. The sleeve portion 280 can extend from the V-Bracket 276 toward and/or away from the elongate shaft 222. In some embodiments, the sleeve portion includes one or more pin holes which can receive a lock pin 236. The handle extension 272 can fit within or around the sleeve portion 222 and shaft extender 270. In some embodiments, each of the handle extension 272, the sleeve portion 222, and shaft extender 270 includes pin holes which can align with each other when the valve actuator 220 is in the locked position. The pin 236 can operate in the same or in a similar manner as the pin 36 described above with respect to the locked and unlocked positions of the valve actuator 220.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially"

as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A valve actuator for a railway car valve, the valve actuator comprising:
    an elongate shaft having a first end, a second end, and a length extending therebetween, the second end of the elongate shaft comprising a cavity extending from the second end through a portion of the length of the elongate shaft and configured to receive and engage with a valve stem of a valve assembly, the elongate shaft comprising a weakened portion between the first and second ends;
    a handle connected to the first end of the elongate shaft and configured to facilitate rotations of the elongate shaft about a rotation axis;
    an elongate tube configured to receive the second end of the elongate shaft, the elongate tube including a first open end and a second open end; and
    a biasing member having a first end configured to engage the valve stem of the valve assembly and a second end configured to engage a portion of the elongate shaft within the cavity, the biasing member configured to bias the elongate shaft away from the valve stem;
    wherein:
        the elongate shaft is configured to transition between a partially engaged position and a fully engaged position;
        the elongate shaft is configured to inhibit accidental rotation of the valve stem when in the partially engaged position;
        the elongate shaft is configured to be incapable of rotating the valve stem when in the partially engaged position;
        the elongate shaft is configured to be capable of rotating the valve stem when in a fully engaged position;
        the biasing member biases the elongate shaft toward the partially engaged position; and
        in the event that the elongate shaft rotates about the rotation axis when in the partially engaged position, said rotation of the elongate shaft would not rotate the valve stem.

2. The valve actuator of claim 1, comprising a protrusion extending from an outer surface of the elongate shaft.

3. The valve actuator of claim 2, wherein the elongate tube includes a channel extending along a portion of a length of the elongate tube and configured to receive the protrusion.

4. The valve actuator of claim 1, wherein the biasing member is positioned at least partially within the cavity of the elongate shaft.

5. The valve actuator of claim 1, wherein the biasing member is a coil spring.

6. The valve actuator of claim 1, wherein the weakened portion of the elongate shaft is configured to shear before rotational force is applied to a valve stem when the elongate shaft is in the partially engaged position.

7. The valve actuator of claim 1, wherein the weakened portion has a smaller outer diameter than any other portion of the elongate shaft.

8. The valve actuator of claim 1, comprising a locking pin configured to extend into a portion of the elongate shaft and elongate tube to prevent transition of the elongate shaft from the partially engaged position to the fully engaged position.

* * * * *